(12) United States Patent
Terörde (10) Patent No.: US 8,441,150 B2
(45) Date of Patent: May 14, 2013

(54) DEVICE FOR CONNECTION TO AN IMPEDANCE HAVING A MAINLY INDUCTIVE CHARACTER

(75) Inventor: Gerd Terörde, Hamminkeln (DE)

(73) Assignee: Atlas Copco Airpower N.V., Antwerpen-Wilrijk (BE)

( * ) Notice: Subject to any disclaimer, the term of this patent is extended or adjusted under 35 U.S.C. 154(b) by 842 days.

(21) Appl. No.: 12/094,588

(22) PCT Filed: Nov. 20, 2006

(86) PCT No.: PCT/IB2006/003329
§ 371 (c)(1),
(2), (4) Date: Mar. 11, 2009

(87) PCT Pub. No.: WO2007/060528
PCT Pub. Date: May 31, 2007

(65) Prior Publication Data
US 2009/0212640 A1  Aug. 27, 2009

(30) Foreign Application Priority Data
Nov. 22, 2005 (NL) ................................ 1030481

(51) Int. Cl.
*H02J 3/00* (2006.01)
(52) U.S. Cl.
USPC ........................................................... 307/82

(58) Field of Classification Search ..................... 307/82
See application file for complete search history.

(56) References Cited

U.S. PATENT DOCUMENTS

| | | | | | |
|---|---|---|---|---|---|
| 4,719,551 | A | * | 1/1988 | Nishizawa et al. | 363/41 |
| 5,168,437 | A | * | 12/1992 | Gyugyi et al. | 363/42 |
| 5,446,642 | A | | 8/1995 | McMurray et al. | |
| 5,757,633 | A | * | 5/1998 | Bowles | 363/71 |
| 6,753,665 | B2 | | 6/2004 | Ueda | |
| 2007/0252659 | A1 | * | 11/2007 | Suenaga et al. | 333/32 |

FOREIGN PATENT DOCUMENTS

| | | |
|---|---|---|
| EP | 0866284 | 9/1998 |
| GB | 178560 | 4/1922 |
| GB | 2 299 216 A | 9/1996 |
| JP | 2003-88177 A | 3/2003 |
| KR | 10 0493797 | 6/2005 |
| WO | WO 90/10339 | 9/1990 |

* cited by examiner

*Primary Examiner* — Rexford Barnie
*Assistant Examiner* — Dru Parries
(74) *Attorney, Agent, or Firm* — Swanson & Bratschun, L.L.C.

(57) ABSTRACT

A device for connection to an impedance having a mainly inductive character. The device comprises a reactive element. Furthermore, the device is provided with inputs for inputting output signals of electric inverters for parallel supply and at least one output for connection to a supply terminal for a phase of the impedance, such that the device is composed to substantially filter out a high-frequency differential component of at least two output signals during use.

15 Claims, 7 Drawing Sheets

DEVICE FOR CONNECTION TO AN IMPEDANCE HAVING A MAINLY INDUCTIVE CHARACTER

RELATED APPLICATIONS

This application is a 35 U.S.C. §371 national phase application of PCT/IB2006/003329 (WO 2007/060528), filed on Nov. 20, 2006, entitled "Device for Connection to an Impedance Having a Mainly Inductive Character", which application claims the benefit of Netherlands Application Serial No. 1030481, filed Nov. 22, 2005, which is incorporated herein by reference in its entirety.

TECHNICAL FIELD

The invention relates a device for connection to an impedance having a mainly inductive character, for instance an electric motor.

SUMMARY OF THE EMBODIMENTS

An electric drive, for instance for a compressor, is connected via terminals to an electric actuator unit which, in practice, comprises for instance inverters. With a relatively high frequency, the inverters present high and low voltages and/or currents in the form of pulses. Through the inductive character of the electric drive, an average voltage is produced which, with optimum design conditions, approximates a predetermined reference voltage.

In addition to the average voltage with a fundamental frequency, however, as a result of the switching behavior of the inverters, there are also voltage components with higher harmonics involved. The latter voltage components, briefly called higher harmonics, cause high-frequency currents in the electric drive, with couple variations as a result. This leads to speed fluctuations, as well as to electrical losses resulting in undesirable heat-up of the drive.

The invention contemplates a device for connection to an inductive impedance, whereby the above-mentioned drawback is counteracted. In particular, the invention aims to obtain a device for connection to an impedance having a mainly inductive character, whereby the creation of voltage components with higher harmonics is counteracted. To that end, the device comprises a reactive element, while the device is further provided with inputs for inputting output signals of electric inverters for parallel supply and at least one output for connection to a supply terminal for a phase of the impedance, such that the device is configured to substantially filter out a high-frequency differential component of at least two output signals during use.

By presenting output signals of the electric inverters to the reactive element, advantageously a high-frequency differential component of two or more output signals can be substantially filtered out. The at least one output for connection to the supply terminal for a phase of the impedance having a mainly inductive character can thus generate an actuation signal in which at least one high-frequency differential component of the original output signals has been substantially eliminated. As a result, the amount of voltage components with higher harmonics, and their energy components in the whole actuation signal, decreases.

Consequently, couple variations of the impedance having a mainly inductive character remain more constant, so that also fluctuations in the speed, as well as undesirable heat-up of the impedance, and early ageing, are counteracted. In addition, the efficiency of the system increases, because less energy is wasted. It is noted that the frequency of the filtered-out differential component is high with respect to the fundamental frequency.

By the use of a plurality of inverters with parallel supply, moreover, the number of discrete voltage levels increases, so that the difference with respect to the predetermined reference voltage is reduced further. Also, the overshoot and the rise time of the supply at the supply terminal decreases. This reduces the common signal of electrical output voltages, also called common mode signals, so that, for instance, also undesirable currents in the bearings at electric machines are reduced. Furthermore, as a result, the mechanical stress in the windings of the impedance having a mainly inductive character decreases. Also, the electromagnetic compatibility problems are reduced as a result. In addition, owing to the more optimal working of the whole, the pulse frequency of the inverters can be set lower, so that losses in the inverters decrease further.

It is noted that the device according to the invention can be applied to impedances of a mainly inductive character having either a single winding or a multiple winding, for instance for supply with three phases.

Advantageously, the reactive element is designed as an inductive element, so that output signals of inverters of the voltage source-type can be decoupled. It is naturally possible to design the reactive element differently, for instance as a capacitive element. In this way, output signals of inverters of especially the current source-type can be decoupled, i.e. at least one high-frequency differential component of two output signals can be substantially filtered out.

It is noted that inductive systems are known for reducing common mode signals using a coil, also called common mode choke. In this way, high-frequency difference signals can actually be passed relatively easily, whilst a common part of two input signals is actually filtered out.

Incidentally, instead of a single reactive element in the device according to the invention, a plurality of reactive elements can be used, for instance in the case of a supply with more than one phase, or for further reducing higher harmonics.

In the use of a conventional output coil connected to an output of an inverter, the dimensions and hence the costs depend on the total phase current. In the case of the device according to the invention, the dimensions of the reactive element depend on the difference signal. The difference signal normally constitutes only a fraction of the total passed supply signal for the impedance. Since the dimensions of the reactive element remain relatively small, a cost benefit can be gained.

Elegantly, the device according to the invention finds application in actuating an electric drive with a relatively high speed. This is because the use of a conventional output coil connected to an output of an inverter moreover entails extra losses and a voltage drop that depends on the fundamental frequency of the supply voltage. Since the voltage drop in the device according to the invention remains practically absent, the device can be advantageously applied with an impedance of a mainly inductive character where the rated speed can be set relatively high.

When furthermore the switching moments of the individual output signals inputted in a reactive element are set differently with respect to each other, a difference signal of two output signals can be filtered out still more effectively. This is because the signal contribution in a first output signal as a result of a higher harmonic then differs from the signal contribution in a second output signal as a result of a higher harmonic. By inputting both output signals into the reactive element, the higher harmonic, forming a difference signal, can be substantially filtered out.

Thus, an algorithm for switching the inverters can be arranged such that during each pulse period one output signal that is inputted in a reactive element does not change. Naturally, it is possible to design a different algorithm, for instance one whereby during each pulse period, only one output signal changes. Furthermore, a strategy can be chosen whereby the output voltage of the reactive element during each pulse period comprises only the two states in which the voltage is most close to the predetermined reference voltage.

Further advantageous embodiments of the invention are set forth in the subclaims.

BRIEF DESCRIPTION OF THE DRAWINGS

The invention will be further elucidated on the basis of exemplary embodiments represented in the drawing. In the drawing.

DETAILED DESCRIPTION

The figures are only schematic representations of the invention and are given exclusively by way of non-limiting exemplary embodiments.

Figure 1:
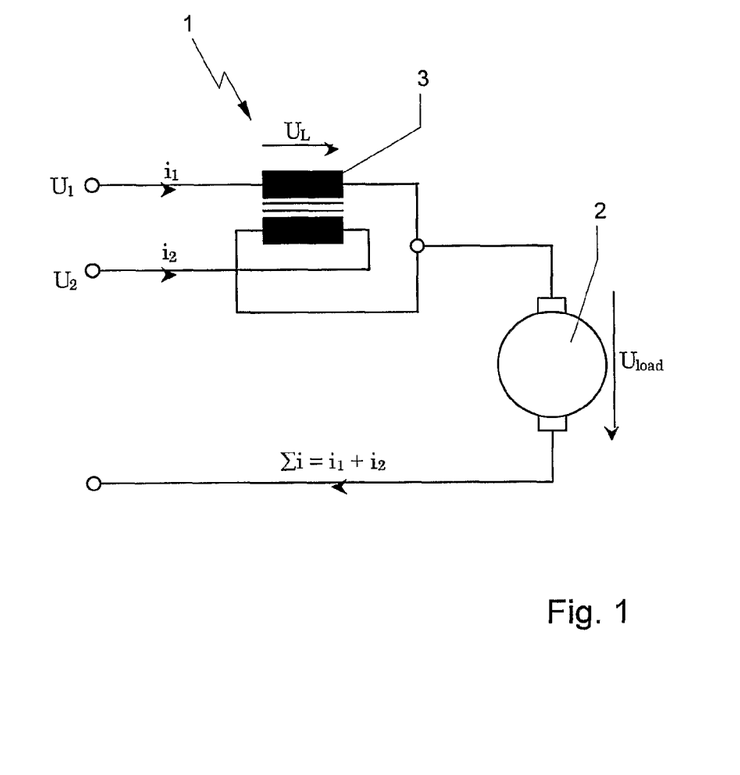
FIG. 1 shows a schematic view of a first embodiment of a device according to the invention which is connected to an impedance having a mainly inductive character.

FIG. 1 shows a schematic view of a first embodiment of a device 1 according to the invention which is connected to an impedance having a mainly inductive character 2. The device 1 comprises a reactive element, designed as an inductive element, more particularly as a transformer 3. The number of windings of the two arms of the transformer 3 corresponds, so that a voltage transfer from 1 is realized. The transformer 3 is provided with inputs for inputting output signals of electric inverters for parallel supply, which are symbolically represented as $U_1$ and $U_2$. Via a first input, a first current $I_1$ flows through a first winding of the transformer, while via a second input a second current $I_2$ flows through the second winding of the transformer 3 in a direction opposite to the first current $I_1$. Across the first winding, there is a voltage $U_L$. The sum signal of $I_1$ and $I_2$, also called the common mode signal, generates opposite magnetic fluxes in the magnetic core of the transformer 3, so that the sum signal can pass unhindered. The difference signal of $I_1$ and $I_2$, also called the differential mode signal, generates a net magnetic flux, so that the difference signal, certainly high-frequency components thereof, is counteracted. Thus, at the output of the transformer 3, at least one high-frequency differential component of the two output signals $I_1$ and $I_2$ is substantially filtered out.

The outputs of the transformer are connected and lead to a supply terminal for a phase of the impedance having a mainly inductive character 2. Thus, the resulting, filtered signal is presented to the impedance having a mainly inductive character 2. Across the impedance having a mainly inductive character, there is a voltage $U_{LOAD}$.

Figure 2:
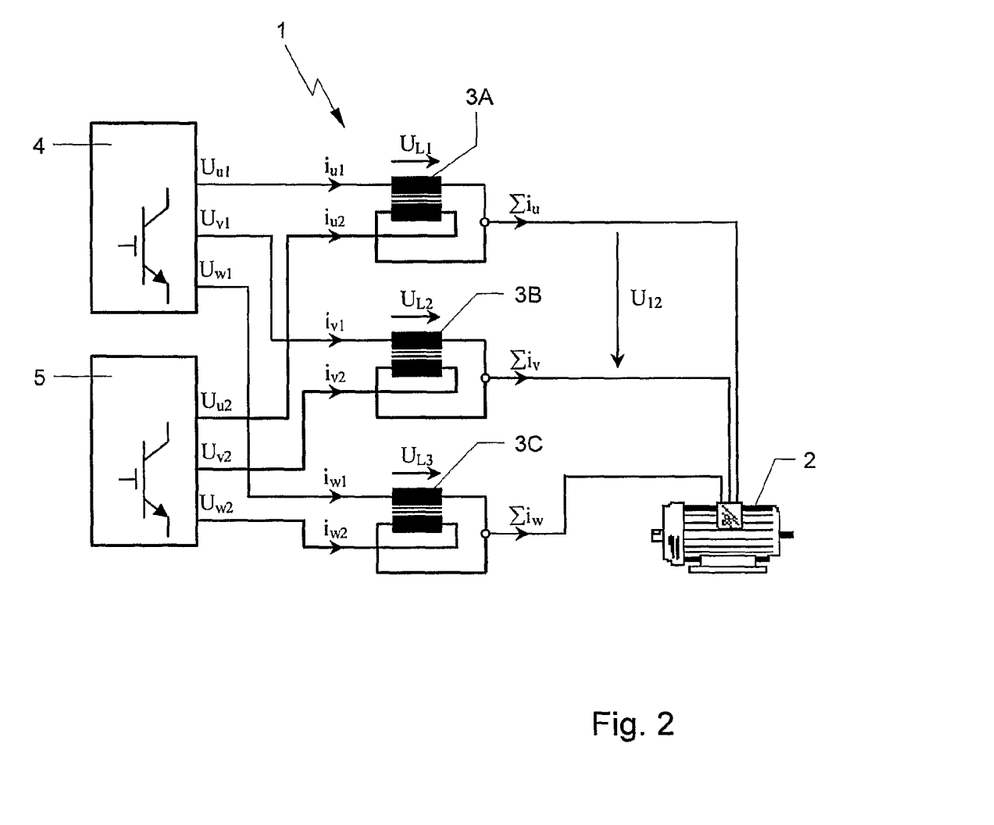
FIG. 2 shows a schematic view of a second embodiment of a device according to the invention which is connected to an impedance having a mainly inductive character.

FIG. 2 shows a schematic view of a second embodiment of a device 1 according to the invention which is connected to an impedance having a mainly inductive character. The impedance having a mainly inductive character is designed as an electric machine 2 with three phases. The electric machine 2 can for instance be used as an electric drive for a motor or for generator applications. In addition, the electric drive can be used for compressors. Furthermore, a different type of load having a mainly inductive character can be used, for instance an active front end and/or an active filter application.

As in the first embodiment of the device 1 according to the invention, two inverters 4, 5, explicitly shown in FIG. 2, generate electric output voltages for actuating the electric machine 2. However, the inverters 4, 5 are each arranged for generating output voltages with three phases $U_{u1}$, $U_{v1}$, $U_{w1}$, $U_{u2}$, $U_{v2}$ and $U_{w2}$. Legs of each phase are pair-wise inputted into an inductive element 3A, 3B and 3C of the device 1 according to the invention, which is for instance designed as the transformer described in relation to FIG. 1. The output signal of each inductive element 3A, 3B and 3C is fed to a supply terminal for a phase of the electric machine 2. In the same way as described in relation to FIG. 1, the electric machine 2 is thus supplied with signals where at least one high-frequency differential component of two output signals has been substantially filtered out.

Figure 3:
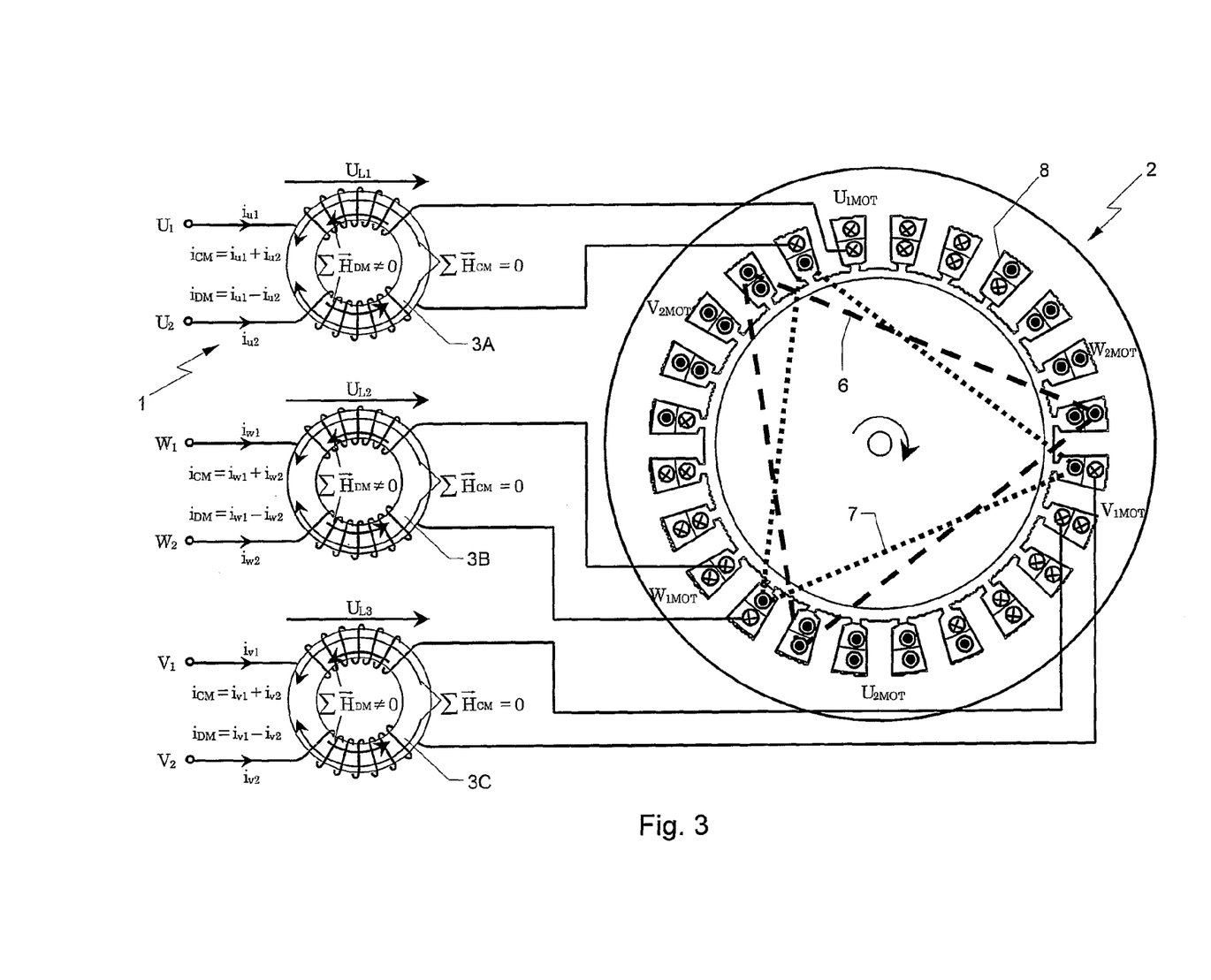
FIG. 3 shows a schematic view of a third embodiment of a device according to the invention which is connected to an impedance having a mainly inductive character.

FIG. 3 shows a schematic view of a practical third embodiment of a device 1 according to the invention which is connected to an impedance having a mainly inductive character. The device 1 comprises, as is the case in the device 1 of FIG. 2, three transformers 3A, 3B and 3C which are connected in a manner comparable to that described above. Further, the output terminals of the transformers 3A, 3B and 3C are connected to supply terminals of a three-phase electric drive 2. The terminals are starting points and/or end points of a double layer of windings 8 with two insulated star points.

Figure 4:
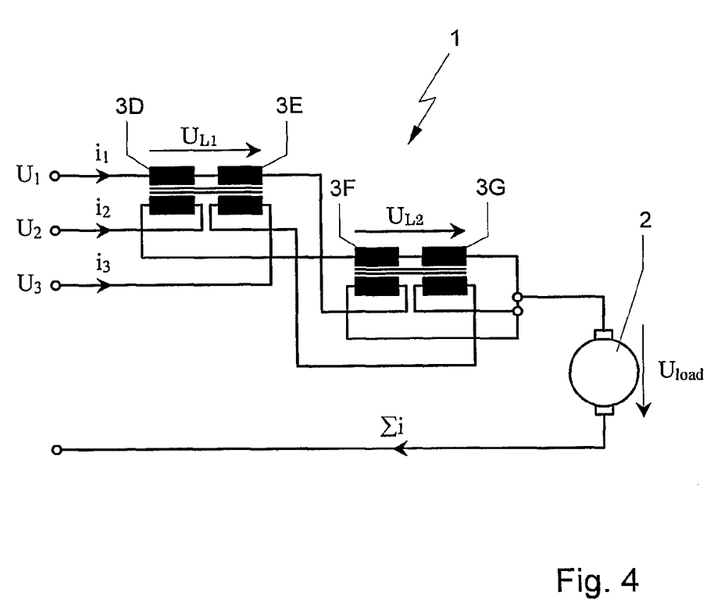
FIG. 4 shows a schematic view of a fourth embodiment of a device according to the invention which is connected to an impedance having a mainly inductive character.

By analogy with FIG. 2, FIG. 4 shows a schematic view of a fourth embodiment of a device 1 according to the invention which is connected to a single-phase inductive impedance 2. Instead of two inverters, in the present embodiment three inverters are used for generating three output voltages $U_1$, $U_2$ and $U_3$. Through the combined inductive elements 3D, 3E, 3F and 3G, during use of the device 1, high-frequency differential components of the three output signals $U_1$, $U_2$ and $U_3$ are substantially filtered out. In a similar manner to that shown in FIG. 3, using the device from FIG. 4, an actuation of a three-phase electric machine can be realized. Naturally, also other circuits can be constructed which realize the same or substantially the same function as the device 1 from FIG. 4. In the design, saturation of the device can be prevented by having an averagely equal output current flow in each leg and providing an equal number of opposite windings in the inductive elements 3, that is, such that the number of windings generating a field in a positive direction is equal to the number of windings generating a field in a negative direction.

Figure 5:
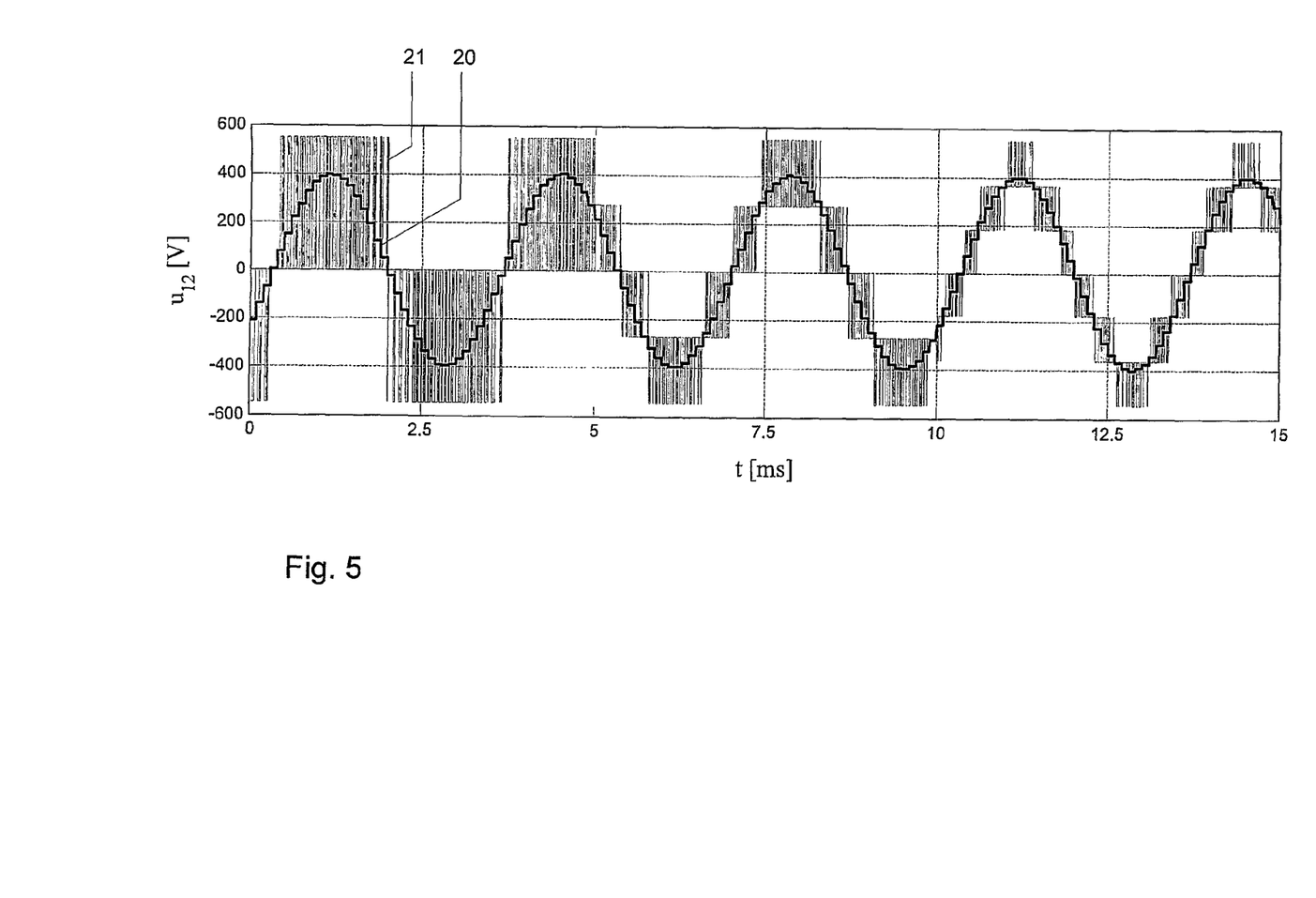
FIG. 5 is a graphic representation of a resulting voltage which is presented to a supply terminal of an impedance having a mainly inductive character.
Figure 6:
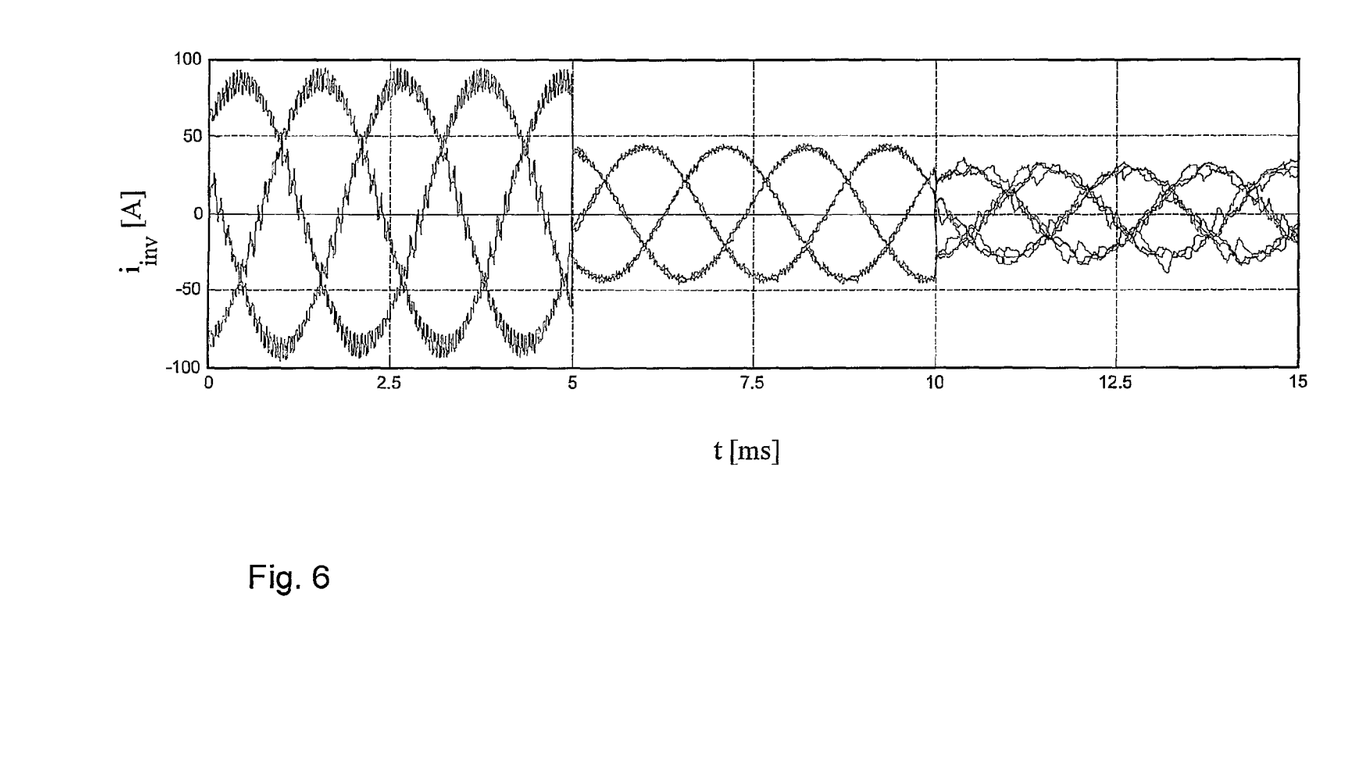
FIG. 6 is a graphic representation of an output current strength of an inverter.
Figure 7:
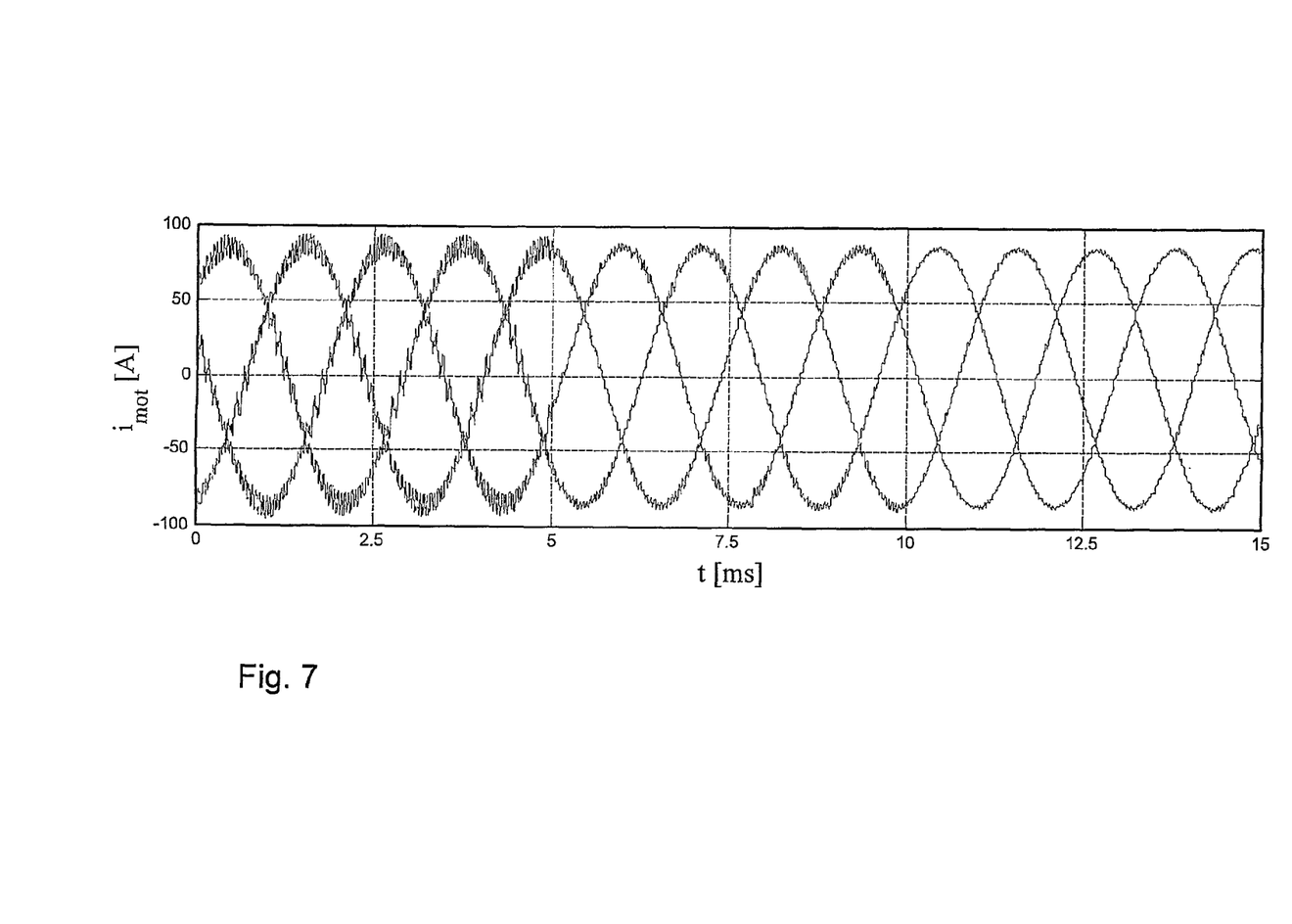
FIG. 7 is a graphic representation of the current strength which is applied via supply terminals to the impedance having a mainly inductive character.

FIGS. 5, 6 and 7 show graphic representations of, respectively, a resulting voltage that is presented to a supply terminal of an impedance having a mainly inductive character, an output current strength of an inverter, and the current strength which is applied via supply terminals to the impedance having a mainly inductive character.

The horizontal axis represents time, with the interval of 0-5 ms showing the situation of a three-phase electric machine that is controlled by a single inverter according to the known prior art. The interval of 5-10 ms shows the situation of a three-phase electric machine that is controlled by two inverters for parallel supply as shown in FIG. 2, while the interval of 10-15 ms shows the situation of a three-phase electric machine that is controlled by three inverters for parallel supply, of which one is shown in FIG. 4.

FIG. 5 shows a predetermined reference voltage 20 of the voltage difference $U_{12}$ between the first and the second phase that is presented to the electric machine. In the example shown, the manipulated output signal of the inverter(s) is a pulse code modulation 21 with three levels. By using more than two inverters with parallel supply, the number of discrete levels increases, viz. five, and seven, respectively, see the intervals of 5-10 ms and 10-15 ms.

FIG. 6 shows in the above-mentioned intervals the corresponding electric output currents $i_{inv}$ from the inverters for all three phases. It is clearly visible that the amplitude of the signals from the individual inverters decreases. However, this is compensated by combining the signals.

Further, FIG. 7 shows the resulting electric currents $i_{mot}$ which are presented to the terminals of the three phases of the electric machine. According to the invention, the ripple on the current signal decreases with the increase of the number of parallel connected inverters. This is caused by the filtering-out of higher harmonics.

The invention is not limited to the exemplary embodiment described here. Many variants are possible.

For instance, the inductive element can be designed not only as a transformer, but also as a different inductive element, such as a toroid, a choke, a ferrite ring, an iron core, a common mode choke, a current-compensated choke and the like.

Further, the device for connection to the impedance having a mainly inductive character, comprising the reactive element, may be arranged in the impedance having a mainly inductive character. In an embodiment according to the invention, the inductive element is at least partly formed by the package of windings of the impedance having a mainly inductive character. It is also possible, however, to position the device separately, outside the impedance having a mainly inductive character. Also, the device can be arranged in one or more inverters.

In addition, instead of a pulse code modulation for the output signals of the inverters, also a different technique can be used, for instance a hysteresis control.

Also, instead of an electric alternating current machine, it is possible to use a different type of impedance having a mainly inductive character, for instance an electric machine which is supplied by a DC current and/or DC voltage.

Furthermore, the impedance having a mainly inductive character can be operative as a load, for instance for converting electric energy into mechanical energy, as with a motor, but also as a source for generating electric energy, as with a generator.

Such variants will be clear to those skilled in the art and are understood to fall within the scope of the invention as set forth in the appended claims.

The disclosure also encompasses all possible permutations of the claim set, as if they were multiple dependent claims.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

The invention claimed is:

1. A device for connection to an impedance having a mainly inductive character, comprising:
   a reactive element;
   inputs for inputting output signals of multiple electric inverters for parallel supply to the reactive element; and
   at least one output for connection to a supply terminal for a phase of the impedance, wherein the device is configured to substantially filter out a high-frequency differential component of at least two output signals by filtering a differential mode signal of the two output signals and by allowing a common mode signal of the two output signals to pass.

2. The device according to claim 1, further comprising outputs for connection to a three-phase impedance having a mainly inductive character.

3. The device according to claim 1, wherein the reactive element comprises an inductive element for decoupling a voltage source inverter.

4. The device according to claim 1, wherein the reactive element comprises a capacitive element for decoupling a current source inverter.

5. The device according to claim 1, wherein the impedance comprises an electric drive.

6. The device according to claim 1, wherein the impedance comprises a compressor drive.

7. The device according to claim 1, wherein the impedance comprises a drive having a high rated speed.

8. The device according to claim 1, wherein the device is arranged in the impedance.

9. The device according to claim 3, wherein the inductive element is at least partly formed by the package of windings of the impedance.

10. The device according to claim 1, wherein a switching moment of at least one of the inverters differs from a switching moment of another of the inverters.

11. The device according to claim 1, which is arranged such that during a pulse period one output signal that is inputted into the reactive element remains unchanged.

12. The device according to claim 1, which is arranged such that an output voltage of the reactive element during a pulse period comprises only two states in which the output voltage is most close to a predetermined reference voltage.

13. The device according to claim 1, wherein the impedance having a mainly inductive character comprises at least one of an active front end and an active filter application.

14. The device according to claim 1, furthermore arranged for switching between electric inverters for parallel supply.

15. A device for connection to an impedance having a mainly inductive character, comprising:
   a reactive element comprising a transformer having a first winding and a second winding;
   inputs for inputting output signals of multiple electric inverters for parallel supply to the reactive element, wherein a first input is connected to the first winding causing a first output signal in the first winding, and wherein a second input is connected to the second winding causing a second output signal in the second winding, wherein the first output signal and the second output signal have current flow in opposite directions;

at least one output for connection to a supply terminal for a phase of the impedance, wherein the device is configured to substantially filter out a high-frequency differential component of at least two output signals by filtering a differential mode signal of the two output signals and by allowing a common mode signal of the two output signals to pass.

* * * * *

UNITED STATES PATENT AND TRADEMARK OFFICE
CERTIFICATE OF CORRECTION

PATENT NO. : 8,441,150 B2  Page 1 of 1
APPLICATION NO. : 12/094588
DATED : May 14, 2013
INVENTOR(S) : Gerd Terörde It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this
Eighth Day of September, 2015

Michelle K. Lee
*Director of the United States Patent and Trademark Office*